United States Patent
Xu et al.

(10) Patent No.: US 12,518,288 B2
(45) Date of Patent: Jan. 6, 2026

(54) CARBON FOOTPRINT ACCOUNTING METHOD FOR SILK REELING STAGE OF RAW SILK

(71) Applicant: SOOCHOW UNIVERSITY, Suzhou (CN)

(72) Inventors: Jianmei Xu, Suzhou (CN); Xinger Bian, Suzhou (CN); Yifeng Hu, Suzhou (CN); Jiayang Dai, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 18/826,680

(22) Filed: Sep. 6, 2024

(65) Prior Publication Data
US 2024/0428268 A1 Dec. 26, 2024

Related U.S. Application Data

(63) Continuation of application No. PCT/CN2022/142166, filed on Dec. 27, 2022.

(30) Foreign Application Priority Data

Sep. 23, 2022 (CN) .......................... 202211170653.5

(51) Int. Cl.
*G06Q 30/018* (2023.01)
(52) U.S. Cl.
CPC ................. *G06Q 30/018* (2013.01)
(58) Field of Classification Search
CPC .............. G06Q 50/04; G06Q 30/018
See application file for complete search history.

(56) References Cited

U.S. PATENT DOCUMENTS

| | | | |
|---|---|---|---|
| 2021/0247740 A1* | 8/2021 | Jia ...................... | G05B 19/4155 |
| 2022/0101212 A1* | 3/2022 | Graeber ................. | G06Q 10/04 |
| 2024/0376801 A1* | 11/2024 | Johnson .................. | E21B 44/00 |

FOREIGN PATENT DOCUMENTS

| | | |
|---|---|---|
| CN | 104217115 A | 12/2014 |
| CN | 107169619 A | 9/2017 |

(Continued)

OTHER PUBLICATIONS

X. Zhang, Z. Xu, C. Gerada and D. Gerada, "Carbon Emission Analysis of Electrical Machines," 2021 24th International Conference on Electrical Machines and Systems (ICEMS), Gyeongju, Korea, Republic of, 2021, pp. 1678-1683. https://ieeexplore.ieee.org/document/9634279?source=IQplus. (Year: 2021).*

*Primary Examiner* — Jeff Zimmerman
*Assistant Examiner* — Hunter Molnar
(74) *Attorney, Agent, or Firm* — SZDC Law PC

(57) ABSTRACT

The invention relates to a carbon footprint accounting method for a silk reeling stage of raw silk, including establishing a mass conservation-based mass evolution relationship between a primary product and byproducts; calculating the process duration according to the mass of the primary product in processes, and combining equipment power to calculate a theoretical annual electricity consumption; calculating a total electricity consumption for each specification of raw silk based on the running efficiency; establishing a step-by-step allocation method for electricity consumption at byproducts generation points; establishing allocation rules and ratios for other energy and material inputs; and performing carbon footprint accounting for different silk specifications according to the allocated annual electricity consumption and the other allocated inputs. The invention changes a conventional practice of simply allocating carbon footprints of final products based on economic (Continued)

value, and achieves precise calculation and allocation of carbon footprints during the silk reeling stage.

10 Claims, 5 Drawing Sheets

(56) References Cited

FOREIGN PATENT DOCUMENTS

| CN | 109881264 | A | * | 6/2019 | | |
|---|---|---|---|---|---|---|
| CN | 111324973 | A | | 6/2020 | | |
| CN | 115392665 | A | * | 11/2022 | ............. | G06F 17/10 |
| CN | 115496369 | A | | 12/2022 | | |
| CN | 109784763 | B | * | 11/2023 | | |

* cited by examiner establishing a mass conservation-based mass evolution relationship between a primary product and byproducts in a silk reeling stage of raw silk, the mass conservation-based mass evolution relationship comprising a cocoon drying process from fresh cocoons to dried cocoons, a cocoon peeling process from the dried cocoons to peeled dried cocoons, a cocoon sorting process from the peeled dried cocoons to reelable cocoons, and a silk reeling process from the reelable cocoons to raw silk

↓ calculating durations according to masses of the primary product in the processes, and calculating a theoretical annual total electricity consumption in the silk reeling stage of raw silk in combination with power of equipment

↓ establishing an equation to equate the theoretical annual total electricity consumption with an actual annual total electricity consumption to solve the running efficiency of the equipment, and calculating a total electricity consumption for each specification of raw silk based on the running efficiency

↓ allocating the total electricity consumption for each specification of raw silk to the byproducts step by step at each byproduct generation point, to obtain annual electricity consumption for each specification of raw silk during the silk reeling stage after allocation

↓ establishing a byproduct allocation rule for other inputs including energy and material, and building an allocation ratio calculation model of various inputs in a silk reeling process of raw silk

↓ performing carbon footprint accounting of various specifications of the raw silk according to the annual electricity consumption and the byproduct allocation rule and allocation ratios of the other inputs of energy and material

FIG. 1

CARBON FOOTPRINT ACCOUNTING METHOD FOR SILK REELING STAGE OF RAW SILK

This application is a Continuation application of PCT/CN2022/142166, filed on Dec. 27, 2022, which claims priority to Chinese Patent Application No. 202211170653.5, filed on Sep. 23, 2022, which is incorporated by reference for all purposes as if fully set forth herein.

FIELD OF THE INVENTION

The present invention relates to the field of textile technologies, and in particular, to a carbon footprint accounting method for a silk reeling stage of raw silk.

DESCRIPTION OF THE RELATED ART

In recent years, China has been advocating sustainable development, controlling greenhouse gas emission, and restricting the use of fossil energy such as coal and petroleum. The textile industry is always a high-energy consumption, high-carbon emission industry, and the greenhouse gas emission in the production and use stages of the textile industry approximately accounts for 3% of the global greenhouse gas emission. Unlike the processing processes of cotton, linen yarns, and synthetic fibers, large amounts of water, natural gas, and electricity are consumed in the raw silk reeling process of raw silk, and the first step of silk reeling, which is cocoon drying, requires a large amount of coal energy. Therefore, the silk reeling process may produce a large negative impact on the environment, causing problems such as excessively high greenhouse gas emission and excessive use of water resources. Therefore, it is urgently needed to conduct carbon footprint accounting for the entire industrial chain of silk products, especially for the energy-intensive reeling stage. This will clarify the carbon footprint distribution of various material and energy inputs, as well as the carbon footprint distribution of each process. It will provide data support for enterprises to implement energy-saving and emission-reduction measures, and guide technological innovation to improve production efficiency, thereby providing a reference for energy conservation and emission reduction.

Main unit processes in the silk reeling stage of raw silk include cocoon drying, cocoon mixing, cocoon sorting, cocoon peeling, trial reeling, cocoon cooking, re-reeling, vacuum moistening, silk skein formation and packing, raw silk inspection, and the like. Inputs in these processes are mainly electricity, natural gas, coal, water, and packaging materials. However, the primary product in the silk reeling process of raw silk has a large weight loss, and there are many byproducts produced during the entire silk reeling process. In addition, silk reeling enterprises currently do not have tertiary metering, and therefore cannot directly obtain the electricity consumption of the investigated product at each process stage. Therefore, carbon footprint accounting for raw silk, especially in terms of electricity consumption, involves allocating the total annual electricity consumption among different specifications of raw silk, and the various processes within the same specification. In addition, due to numerous byproducts and ongoing weight loss of the primary product during various processing processes, challenges arise in accurately allocating electricity consumption. In addition, a portion of the carbon footprint accounting results for the final product needs to be allocated to the byproducts. At present, the electricity allocation in the carbon footprint accounting for the raw silk reeling stage does not account for the continuous change in the mass of the primary product, and there is no specific allocation method provided for the byproducts.

Therefore, there is an urgent need to provide a carbon footprint accounting method for a silk reeling stage of raw silk, to resolve the foregoing problems in the prior art.

SUMMARY OF THE INVENTION

Therefore, a technical problem to be resolved by this invention is to overcome the existing problem in the prior art by providing a carbon footprint accounting method for a silk reeling stage of raw silk. This method changes the conventional practice of simply allocating carbon footprint of the final product based on economic value, achieving precise accounting and allocation of the carbon footprint during the raw silk reeling stage.

To resolve the foregoing technical problem, the present invention provides a carbon footprint accounting method for a silk reeling stage of raw silk, including:

Establishing a mass conservation-based mass evolution relationship between a primary product and byproducts in a silk reeling stage of raw silk, the mass conservation-based mass evolution relationship including a cocoon drying process from fresh cocoons to dried cocoons, a cocoon peeling process from the dried cocoons to peeled dried cocoons, a cocoon sorting process from the peeled dried cocoons to reelable cocoons, and a silk reeling process from the reelable cocoons to raw silk;

calculating durations according to masses of the primary product in the processes, and calculating a theoretical annual total electricity consumption in the silk reeling stage of raw silk in combination with power of equipment;

establishing an equation to equate the theoretical annual total electricity consumption with an actual annual total electricity consumption to solve the running efficiency of the equipment, and calculating a total electricity consumption for each specification of raw silk based on the running efficiency;

allocating the total electricity consumption for each specification of raw silk to the byproducts step by step at each byproduct generation point, to obtain annual electricity consumption for each specification of raw silk during the silk reeling stage after allocation;

establishing a byproduct allocation rule for other inputs including energy and material, and building an allocation ratio calculation model of various inputs in a silk reeling process of raw silk; and performing carbon footprint accounting of various specifications of the raw silk according to the annual electricity consumption and the byproduct allocation rule and allocation ratios of the other inputs of energy and material.

In an embodiment of the present invention, a method for calculating, according to masses of the primary product in the processes, durations used in each process comprises:
performing calculation according to total amounts of the primary product of the processes and production capacities of the processes, or performing calculation directly according to the total number of workdays based on output proportions of different specifications.

In an embodiment of the present invention, a calculation formula for solving running efficiency of the equipment is as follows:

$$\sum_{i=1}^{m}\left(\sum_{j=1}^{12}(t_{i,j}W_{j,light})+\eta\sum_{j=1}^{12}(t_{i,j}W_{j,equip})+\sum_{j=1}^{12}\left(\frac{t_{i,j}d_{fan}W_{j,fan}}{D_{annual}}\right)+\eta\frac{Y_{i}t_{air}W_{air}}{\sum_{i=1}^{m}Y_{i}}\right)=E_{industry}$$

wherein in the formula, $t_{i,j}$ (i=1, 2, ..., m; j=1, 2, ..., 11) is a production duration of an $i^{th}$ specification of raw silk in a $j^{th}$ production process thereof; $W_{j,light}$ is a total lighting power of the $j^{th}$ production process; $\eta$ is the running efficiency of the equipment; $W_{j,equip}$ is a total primary equipment power of the $j^{th}$ production process; $W_{j,fan}$ is a total fan power of the $j^{th}$ production process; $d_{fan}$ is the number of days of using fans in a whole year; $D_{annual}$ is the total number of workdays in a whole year; $W_{air}$ is a total air conditioner power; $t_{air}$ is a duration of using air conditioners in a whole year; and $Y_i$ is an annual output of the $i^{th}$ specification of the raw silk, and $E_{industry}$ is the actual annual total electricity consumption value.

In an embodiment of the present invention, a formula for calculating the total electricity consumption of various specifications of raw silk is as follows:

$$E_i = \sum_{j=1}^{12}(t_{i,j}W_{j,light}) + \eta\sum_{j=1}^{12}(t_{i,j}W_{j,equip}) + \eta\sum_{j=1}^{12}\left(\frac{t_{i,j}d_{fan}W_{j,fan}}{D_{annual}}\right) + \eta\frac{Y_i t_{air} W_{air}}{\sum_{i=1}^{m}Y_i}$$

wherein in the formula, $t_{i,j}$ (i=1, 2, ..., m; j=1, 2, ..., 11) is the production duration of the $i^{th}$ specification of the raw silk in the $j^{th}$ production process thereof; $W_{j,light}$ is the total lighting power of the $j^{th}$ production process; $\eta$ is the running efficiency of the equipment; $W_{j,equip}$ is the total primary equipment power of the $j^{th}$ production process; $W_{j,fan}$ is the total fan power of the $j^{th}$ production process; $d_{fan}$ is the number of days of using fans in a whole year; $D_{annual}$ is the total number of workdays in a whole year; $W_{air}$ is the total air conditioner power; $t_{air}$ is the duration of using air conditioners in a whole year; and $Y_i$ is the annual output of the $i^{th}$ specification of the raw silk.

In an embodiment of the present invention, when allocating the total electricity consumption for each specification of raw silk to the byproducts step by step at each byproduct generation point, the allocation is performed at each process node where the byproducts are generated, and the electricity consumption for allocation is cut off at the node where the byproduct is generated.

In an embodiment of the present invention, seven byproducts are generated in a silk reeling production process of raw silk, comprising: cocoon outer floss, defective cocoons, frison, pupa shell, pupa, waste silk from inspection, and raw silk from trial reeling.

In an embodiment of the present invention, after allocating the total electricity consumption for each specification of raw silk to the byproducts step by step at each byproduct generation point, the obtained annual electricity consumption for different specifications of raw silk in the silk reeling stage of raw silk are as follows:

$$\begin{cases} E'_i = \left(\left(\left(\sum_{j=1}^{3}E_{i,j}d_1 + E_{i,4}\right)d_2 + E_{i,4} + \sum_{j=5}^{7}E_{i,j}\right)d_{345} + \sum_{j=8}^{12}E_{i,j}\right)d_{67} \\ d_1 = \dfrac{\alpha p}{\alpha p + (1-\alpha)p_1} \\ d_2 = \dfrac{\beta p}{\beta p + (1-\beta)p_2} \\ d_{345} = \dfrac{100p/\varepsilon}{100p/\varepsilon + \gamma p_3 + \delta p_4 + \xi p_5} \\ d_{67} = \dfrac{100p/\varepsilon}{100p/\varepsilon + \gamma p_3 + \delta p_4 + \xi p_5} \end{cases}$$

wherein in the formula, $E_{i,j}$ (i=1, 2, ..., m; j=1, 2, ..., 10) is an electricity consumption of an $i^{th}$ specification of raw silk in a $j^{th}$ production process thereof; $\alpha$ is a mass loss fraction in cocoon peeling, a percentage of a weight of the peeled dried cocoons after cocoon peeling in a weight of raw dried cocoons; $\beta$ is mass loss fraction in cocoon sorting, a percentage of a weight of the reelable cocoons after cocoon sorting in a weight of the peeled dried cocoons before cocoon sorting; $\varepsilon$ is a reeling loss; $\gamma$ is a frison fraction; $\delta$ is a pupa shell fraction; $\xi$ is a pupa fraction; and p is a selling price of the primary product, $p_i$ (i=1,2 ... n) is a market price of an $i^{th}$ type of byproduct in a referenced year; $d_i$ (i=1, 2, ..., n) is an allocation ratio of the $i^{th}$ byproduct during carbon footprint allocation, therefore $d_i$ denotes an allocation ratio of a byproduct 1 participating in allocation, $d_2$ denotes an allocation ratio of a byproduct 2 participating in allocation, and so on; $d_{345}$ denotes a allocation ratio of byproducts 3, 4, and 5 participating in allocation simultaneously; and $d_{67}$ denotes an allocation ratio of byproducts 6 and 7 participating in allocation simultaneously.

In an embodiment of the present invention, when allocating other inputs of energy and material, examining each type of input individually, performing allocation for shared input, and no allocation for input without sharing; for the shared allocation, energy or material that are input once in a certain process are allocated only once at the end, with the allocation ratio d as follows:

$$d = xp \bigg/ \left(xp + \sum_{i=1}^{n_e} x_i p_i\right)$$

in the formula, $n_e$ ($n_e \leq n$) is the number of types of byproducts with shared inputs, $x_i$ (i=1, 2, ..., n) denotes an output of an $i^{th}$ byproduct in silk reeling production, x is an output of the primary product, and p is a selling price of the primary product, $p_i$ (i=1, 2, ..., n) is a market price of an $i^{th}$ type of byproduct in a referenced year.

In an embodiment of the present invention, most inputs like water taking, waste water treatment, reused water treatment, and steam are all inputs in a cocoon cooking process and the silk reeling process, mainly byproducts 3, 4, 5, 6, and 7 participate in allocation, and in this case the distribution ratio may be written as:

$$d_{3-7} = \frac{100(1-\lambda)p}{\varepsilon} \bigg/$$

-continued $$\left(\frac{100(1-\lambda)p}{\varepsilon} + \gamma p_3 + \delta p_4 + \xi p_5 + \frac{100\lambda p_6}{\varepsilon}\left(\frac{M_{bypro7}}{\sum_{i=1}^{m} Y_i}\right)\frac{100(1-\lambda)p}{\varepsilon}\right)$$

wherein in the formula, $Y_i(i=1, 2, \ldots, m)$ is an annual total production output of an $i^{th}$ specification of raw silk; $M_{bypro7}$ is a total annual amount of raw silk from trial reeling; $\varepsilon$ is a reeling loss; $\gamma$ is a frison fraction; $\delta$ is a pupa shell fraction; $\xi$ is a pupa fraction; $p_i$ (i=1, 2, \ldots, n) is a market price of an $i^{th}$ type of byproduct in a referenced year; $\lambda$ is percentage of waste silk from inspection.

In an embodiment of the present invention, a formula of the carbon footprint accounting of the specifications of the raw silk is as follows:

$$CFP_i = \left((E'_i + d_{3-7} \times E_{water})f_{electricity} + \sum_{k=1}^{n_m} d_x MT_{i,k} f_{MT_k}\right) \bigg/ \sum_{i=1}^{m} Y_i$$

wherein in the formula, $CFP_i(i=1, \ldots, m)$ is a carbon footprint of the $i^{th}$ specification of the raw silk; $E_{waste}$ is an electricity consumption of water taking, waste water treatment, and reused water treatment; $f_{electricity}$ is a carbon emission factor of electricity power; $MT_{i,k}$ (i=1, 2, \ldots m; k=1, 2, \ldots, $n_m$) is a consumption of a $k^{th}$ input of material and energy for the $i^{th}$ specification of the raw silk; and $f_{MT_k}$ is a greenhouse gas emission factor of the $k^{th}$ input of material and energy, $d_x$ is a carbon footprint allocation ratio for different inputs of material and energy, with subscript x indicating different values for various inputs, and $d_{3-7}$ is an allocation ratio of the byproducts 3, 4, 5, 6, and 7 participating in allocation. $Y_i(i=1, 2, \ldots, m)$ is an annual total production output of an $i^{th}$ specification of raw silk.

Compared with the prior art, the foregoing technical solution of the present invention has the following advantages:

In the present invention, a mass evolution relationship between a primary product and various co-products throughout the entire production process is established based on the principle of mass conservation, and a system and method for electricity consumption allocation and carbon footprint accounting during the silk reeling stage is constructed based on the categories and mass evolution of the primary product. This changes the conventional practice of simply allocating the carbon footprint of the final product based on economic value, achieving precise accounting and allocation of the carbon footprint during the silk reeling stage of raw silk.

BRIEF DESCRIPTION OF THE DRAWINGS

To make the content of the present invention clearer and more comprehensible, the present invention is further described in detail below according to specific embodiments of the present invention and the accompanying drawings.

FIG. 1 is a schematic flowchart of a carbon footprint accounting method for a silk reeling stage of raw silk according to an embodiment of the present invention.

DETAILED DESCRIPTION OF THE PREFERRED EMBODIMENTS

Figure 2:
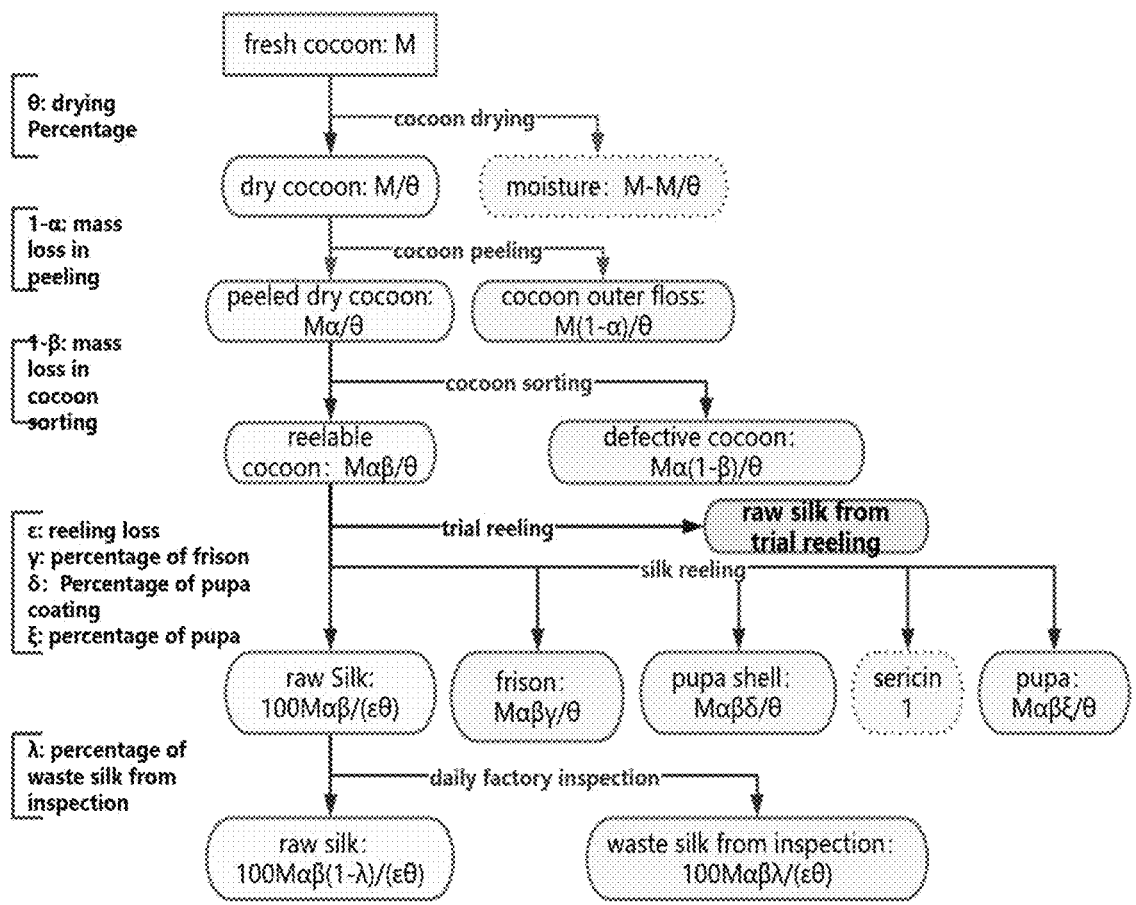
FIG. 2 is a schematic diagram of a mass conservation-based mass evolution relationship between a primary product and byproducts in a silk reeling stage of raw silk according to an embodiment of the present invention.

The present invention is further described below with reference to the accompanying drawings and specific embodiments, to enable a person skilled in the art to better understand and implement the present invention. However, the embodiments are not used to limit the present invention.

Embodiment 1

Referring to FIG. 1, an embodiment of the present invention provides a carbon footprint accounting method for a silk reeling stage of raw silk, including the following steps:

Step S101: establishing a mass conservation-based mass evolution relationship between a primary product and byproducts in a silk reeling stage of raw silk, the mass conservation-based mass evolution relationship comprising a cocoon drying process from fresh cocoons to dried cocoons, a cocoon peeling process from the dried cocoons to peeled dried cocoons, a cocoon sorting process from the peeled dried cocoons to reelable cocoons, and a silk reeling process from the reelable cocoons to raw silk.

Step S102: calculating durations according to masses of the primary product in the processes, and calculating a theoretical annual total electricity consumption in the silk reeling stage of raw silk in combination with power of equipment.

Step S103: establishing an equation to equate the theoretical annual total electricity consumption with an actual annual total electricity consumption to solve the running efficiency of the equipment, and calculating a total electricity consumption for each specification of raw silk based on the running efficiency.

Step S104: allocating the total electricity consumption for each specification of raw silk to the byproducts step by step at each byproduct generation point, to obtain annual electricity consumption for each specification of raw silk during the silk reeling stage after allocation.

Step S105: establishing a byproduct allocation rule for other inputs including energy and material, and building an allocation ratio calculation model of various inputs in a silk reeling process of raw silk; and.

Step S106: performing carbon footprint accounting of various specifications of the raw silk according to the annual electricity consumption and the byproduct allocation rule and allocation ratios of the other inputs of energy and material.

In the present invention, a relationship between a primary product and various symbiotic products in an entire production procedure is first established based on mass conservation, and a class of the primary product and a mass evolution process are provided. Next, based on the class of the primary product and the mass evolution process, an algorithm for distribution of annual total electricity consumption of a mill among processes products of specifications and each specification of raw silk products is established, to construct a carbon footprint accounting system and method for electricity consumption distribution and electricity power in a silk reeling stage of raw silk. In addition, based on the relationship between the primary product and various symbiotic products in the entire production procedure, a method for distributing carbon footprints based on economic value and positions of processes in which symbiotic products are generated is established. A conventional simple approach for performing distribution on carbon footprints of final products based on economic value is changed, to implement accurate accounting and accurate distribution of carbon footprints in a silk reeling stage of a raw silk product.

The specific allocation algorithm calculates the total theoretical annual electricity consumption during the reeling stage by determining the actual processing time of the primary product in each process, and combining it with rated power and running efficiency of each piece of equipment. The running efficiency of the equipment is a ratio of an actual running power to the rated power. The running efficiency of the equipment can be determined by establishing an equation between the theoretical electricity consumption and the actual electricity consumption. This allows for the calculation of the electricity consumption for each process of each product type, thereby completing the allocation of electricity consumption. Each portion of electricity consumption is then multiplied by the emission factor of the electricity in the location of the factory, resulting in the carbon footprint distribution of each specification in the silk reeling stage, as well as carbon footprint analysis for each process of each product type. This facilitates factories in implementing energy-saving and emission-reduction measures according to the carbon footprint accounting results. The allocation of the carbon footprint of the primary product to the co-products is determined by the system boundary of the carbon footprints involved in the allocation, based on the stage of the process where the co-products are generated. That is, carbon footprints generated in processes that the primary product undergoes after the co-products are generated is not included in the allocation.

The main sources of greenhouse gas emissions in the silk reeling stage of raw silk are electricity, natural gas, coal, water, and other energy, with electricity being the most challenging to account for. Electricity usage includes lighting, fans, air conditioners, and primary equipment. Since each unit process does not have an independent electricity meter, and because the primary product continuously undergoes mass losses and byproducts are continuously generated during the process, the estimation of electricity consumption for each process should always follow the principle of mass conservation, accurately accounting for the mass changes of the primary product and the co-products. Therefore, this invention first establishes the mass evolution relationship between the primary product and byproducts based on the principle of mass conservation, as shown in FIG. 2. Then, the duration of each process is calculated according to the mass of the primary product in each process and the production capacity of each process. Subsequently, the electricity consumption is estimated according to the power of the equipment in each process. To ensure the accuracy of the estimation, the total electricity consumption of all processes and products must equal the overall total electricity consumption.

Specifically, in Step S101, the mass evolution relationship between a primary product and byproducts is as follows:

(1) Fresh Cocoons are Turned into Dried Cocoons Through the Cocoon Drying Process Cocoon drying is basically completed at silk reeling factories, although some company-operated sericulture bases have their own cocoon dryers and sell dried cocoons. To avoid double calculation counting in accounting, the carbon emissions from the cocoon drying process are always calculated as part of the silk reeling stage. Factories generally record the drying ratio, which is the ratio of the weight of fresh cocoons to the weight of dried cocoons, denoted as $\theta$. The value generally ranges from 2.5 to 2.8, with some variations among different factories. If the mass of fresh cocoons is M, the weight $m_{dry}$ of the dried cocoons is $m_{dry}=M/\theta$ The portion of the mass loss is attributed to moisture.

(2) Dried Cocoons are Turned into Stripped Dried Cocoons Through the Cocoon Stripping Process The dried cocoons, after being dried, need to have their outer layers, which cannot be reeled into raw silk, removed by a cocoon stripping machine. Let the percentage of the weight of the stripped dried cocoons relative to the weight of the unprocessed dried cocoons be denoted as the stripping rate $\alpha$, and the weight $m_{net-dry}$ of the stripped dried cocoons is $m_{net-dry}=M\alpha/\theta$. The byproduct generated in this process is cocoon outer floss, which can be sold as floss silk, and the weight of the cocoon outer floss $M_{bypro1}$ is $M_{bypro1}=M(1-\alpha)/\theta$.

(3) Stripped Dried Cocoons are Turned into Reelable Cocoons Through a Cocoon Sorting Process Cocoon sorting generally includes rough sorting and fine sorting. Rough sorting is generally used for reeling raw silk below 4A grade. At present, most silk reeling factories produce high-grade raw silk, and fine sorting is commonly used. Let the percentage of the weight of reelable cocoons after cocoon sorting relative to the weight of the stripped dried cocoons before cocoon sorting be denoted as the cocoon sorting ratio $\beta$, and the mass $m_{good-cocoon}$ of reelable cocoons is $m_{goodcocoon}=M\alpha\beta/\theta$ Byproducts generated after the cocoon sorting process are waste cocoons and light defective cocoons, collectively referred to as defective cocoons, and the weight $M_{bypro2}$ of the defective cocoons is $M_{bypro2}=M\alpha(1-\beta)/\theta$.

(4) Reelable Cocoons are Turned into Raw Silk Through a Silk Reeling Process

Reelable cocoons are reeled after the cocoon cooking process, and are turned into raw silk through the silk reeling process. The factory generally uses a reeling discount to measure the silk yield of reelable cocoons. The reeling discount is a weight in kg of reelable cocoons required to reel every 100 kg of raw silk. If the reeling discount is $\varepsilon$, the primary product of the silk reeling process is raw silk, and the mass $m_{raw-silk}$ of the raw silk is $m_{raw-silk}=100M\alpha\beta/(\varepsilon\theta)$. Byproducts generated by the silk reeling process include frison, pupa shell, and pupa, with approximately 1% of sericin dissolving during the silk cooking and reeling processes. During trial reeling process, the frison amount $M_{by3}$ and the pupa shell amount $m_{by4}$ for one cocoon, and the average cocoon weight $m_{cocoon}$ of cocoons are determined. The frison ratio $\gamma$ is computed using $\gamma=m_{by3}/m_{cocoon}$, the pupa shell ratio is computed using $\delta=m_{by4}/m_{cocoon}$, and the silkworm chrysalis ratio is computed using $\xi=0.99-100/m-\gamma-\delta$. Correspondingly, the masses of the three byproducts are respectively expressed as:

$$M_{bypro3} = M\alpha\beta\gamma/\theta = M\alpha\beta \times m_{by3}/(\theta \times m_{cocoon}) \quad (1)$$

$$M_{bypro4} = M\alpha\beta\delta/\theta = M\alpha\beta \times m_{by4}/(\theta \times m_{cocoon}) \quad (2)$$

$$M_{bypro5} = M\alpha\beta(0.99 - 100/m - \gamma - \delta)/\theta \quad (3)$$

To control and ensure the quality of the raw silk product, silk reeling factories take a certain amount of sample silk for daily factory inspection. After inspection, this portion of silk can only be sold as a byproduct, and its mass is $M_{bypro6}$. In the entire silk reeling production, there is also a type of special byproduct, which is the raw silk from trial reeling. The amount of raw silk from trial reeling is very small and can almost be neglected. However, for the sake of completeness, the mass of the raw silk from trial reeling can be recorded as $M_{bypro7}$, and this data may be obtained through factory surveys.

Specifically, in Step S101, process durations are calculated as follows:

There are mainly two methods for calculating process duration for each process. In the first method, the durations are calculated according to total production of primary products and the production capacity of each process. In the second method, for some processes, the durations are directly calculated by allocating the total workdays based on output proportions for different specifications of raw silk.

(1) Cocoon Drying Process

The raw material cocoons are generally fresh cocoons, and the first process is cocoon drying. Silk reeling factories typically use equipment that can process 10 tons of cocoons per day, operating 24 hours a day. Therefore, a processing duration $t_1$ of the cocoon drying process is:

$$t_1 = M/w_{dry} \quad (4)$$

where, $W_{dry}$ is an average cocoon drying amount per hour, in kilograms (kg).

(2) Cocoon Mixing Process

The silk reeling factory purchases cocoons from different farms. To balance the quality of raw material cocoons and ensure consistent silk production quality, cocoons from different farms with similar quality are mixed in proportion according to processing requirements. There are generally two mixing forms: manual mixing and machine mixing. If the cocoon mixing capacity is $W_{mix}$ in kg/h, then the processing duration for the mixing process is:

$$t_2 = M/(\theta \times w_{mix}) \quad (5)$$

where, $W_{mix}$ is a processing amount per hour of the cocoon mixing process in kg.

(3) Cocoon Stripping and Sorting Processes

The cocoon stripping and sorting processes are generally performed simultaneously using a stripping and sorting joint machine. However, due to the fast stripping speed, some factories often need several cocoon sorting belts for one cocoon stripping machine. In smaller factories with lower output, one cocoon sorting belt is equipped for one cocoon stripping machine, causing inconsistencies in working times. Therefore, the time taken for stripping and sorting are calculated separately:

$$t_3 = M/(\theta \times w_{peeling}) \quad (6)$$

$$t_4 = \alpha \times M/(\theta \times w_{pickling}) \quad (7)$$

In the formula, $t_3$ and $t_4$ are respectively the cocoon stripping duration and the cocoon sorting duration in hours (h). $W_{peeling}$ and $W_{picking}$ are respectively the hourly processing capacities of the cocoon stripping and sorting processes.

(4) Trial Reeling

Before reeling each batch of cocoons, trial reeling is performed to determine the silk reeling process parameters and key points. Generally 200 cocoons are used for each trial reeling. A trial reeling machine generally has 10 ends. The amount of raw silk produced from trial reeling is relatively small, and usually cannot be used, and is typically sold as a byproduct. Each batch of silk is quite large; relatively, the electricity used and byproducts generated in each trial reeling process can be almost negligible. Consequently, calculations are not performed for each batch of silk. Instead, the total amount of trial reeling silk generated by the factory annually is allocated to different specifications of raw silk based on outputs of the specifications, and then a total duration $t_5$ of trial reeling is estimated based on the average hourly production capacity of the reeling machine:

$$t_5 = 2M_{bypro6}/w_{reeling} \quad (8)$$

(5) Cocoon Cooking Process

In the cocoon cooking process, the mass of the processed raw material changes further. If the hourly production capacity of the cocoon cooking machine is $W_{cooking}$, then the processing duration $t_6$ for this process can be calculated by:

$$t_6 = \alpha \times \beta \times M/(\theta \times w_{cooking}) \quad (9)$$

(6) Silk Reeling Process

A size-fixed silk reeling machine is generally used in the silk reeling process at present, and each group of reeling machine consists of 20 units, and each unit has 20 ends. If the hourly production capacity of the silk reeling is $W_{reeling}$ for one unit, and a processing duration $t_7$ of the reeling process is:

$$t_7 = 100\alpha \times \beta \times M/(\varepsilon \times \theta \times (20n_{reeling} \times w_{reeling})) \quad (10)$$

where, $n_{reeling}$ is the quantity of groups of silk reeling machines.

(7) Vacuum Permeation Process

Vacuum permeation is to uniformly moisten raw silk, to facilitate the separation of silk and threads in a subsequent re-reeling process. The vacuum permeation process generally involves placing $n_{reel}$ small silk reels simultaneously into a moistening machine. The actual running time $t_{wet}$ (including the start and end of vacuuming) of the moistening machine is 7.2 min, during which the "vacuuming-atmospheric pressure" cycle is repeated $n_{repeat}$ times. Each small reel contains 180 grams of raw silk. Thus, the processing duration for this process $t_8$ is calculated as:

$$t_8 = \frac{100\alpha \times \beta \times M/(\varepsilon \times \theta)}{0.18 n_{reel}/(t_{wet} \times n_{repeat}/60)} \quad (11)$$

(8) Re-Reeling Stage

In re-reeling process involves transferring the silk from small reel that have undergone vacuum permeation onto large reel. This process helps to dry the silk strands and remove some defects in the silk threads. Each re-reeling machine has 50 windows, each windows has 20 large reel, totaling 100 large reels. The processing duration $t_9$ for this process can be calculated according to a re-reeling speed $V_{rereeling}$, in r/min, and the nominal fineness of raw silk $Size_{rawSilk}$, in denier. The formula to calculate the processing duration is as follows:

$$t_9 = \frac{100\alpha \times \beta \times M/(\varepsilon \times \theta)}{100 \times 60 \times v_{rereeling} \times L_{reel} \times Size_{rawsilk}/9000} \quad (12)$$

(9) Packing Process

After the re-reeling process, silk end tying and skein lacing will be conducted. This process is completed manually with only lighting and fans being used. Subsequently, booking and packing is conducted using a skein booking and packing machine. Every 28 silk skeins are bundled into a book, and the booking process takes 1 minute per book. Therefore, the processing duration $t_{10}$ for the packing process is:

$$t_{10} = \frac{100\alpha \times \beta \times M/(\varepsilon \times \theta)}{0.18 \times 28 \times 60} \quad (13)$$

(10) Raw Silk Inspection

The raw silk inspection includes two types of tests: silk size inspection (including moisture regain measurement) and Seriplane inspection. An eight-basket oven is required in the silk size inspection, drying is generally performed once a day for one hour per session. In addition, a denier size tester and the winding frame required for silk size inspection have short working time and low power consumption, and therefore are negligible. A Seriplane machine is used in the Seriplane inspection to reel silk panel samples, and it generally takes 0.5 hour to reel every 100 samples. Since the working hours (8.5 hours a day) of the inspection department matches the silk reeling process, the working duration for raw silk inspection can be estimated based on the number of working days in the silk reeling process. The number of working days required for all silk reeling machines in the factory to simultaneously reel the specified raw silk is $t_{day}=t_6/t_{work}$, where $t_{work}$ is the daily working hours of the silk reeling factory.

$$t_{11} = \frac{t_7}{t_{work}}, \quad (14)$$

$$t_{12} = \frac{0.5 n_{panel}}{100} \times \frac{t_7}{t_{work}}$$

In the formula, $t_{11}$ and $t_{12}$ are respectively working durations of the fineness inspection and the Seriplane inspection.

Specifically, in Step S103, the running efficiency of the equipment is calculated as follows:

The electricity consumption in the silk reeling stage of raw silk primarily categorized into four types: lighting, primary production equipment, fans, and air conditioners.

The electricity consumption for lighting and the primary equipment are basically determined by a process duration of each process.

The electricity consumption of fans and air conditioners is seasonal and not used throughout the entire year. Fans are typically used during the hottest months. For example, in Jiangsu and Zhejiang provinces, fans are generally operated from June to September, though the specific time can vary each year and by location. When calculating of the electricity consumption of fans for a particular product, the electricity consumption for these months should be evenly distributed over the entire year. Air conditioners are generally not used in silk reeling factories, and only 1 to 2 air conditioners are installed in rooms where leftover cocoons from silk reeling are stored overnight or during holidays.

It needs to be noted that actual running powers of fans and industrial equipment in a running process are less than their rated powers due to a certain running efficiency. The running efficiency is the ratio of actual power to rated power. Therefore, the total electricity consumption $E_{industry}$ for the annual production processes can be expressed by the following formula:

$$\sum_{i=1}^{m}\left(\sum_{j=1}^{12}(t_{i,j}W_{j,light}) + \eta\sum_{j=1}^{12}(t_{i,j}W_{j,equip}) + \sum_{j=1}^{12}\left(\frac{t_{i,j}d_{fan}W_{j,fan}}{D_{annual}}\right) + \eta\frac{Y_i t_{air}W_{air}}{\sum_{i=1}^{m}Y_i}\right) = E_{industry} \quad (15)$$

$t_{i,j}$ (i=1, 2, . . . , m; j=1, 2, . . . , 11) is the production duration of the $i^{th}$ specification of the raw silk in the $j^{th}$ production process thereof; $W_{j,light}$ is the total lighting power of the $j^{th}$ production process; $\eta$ is the running efficiency of the equipment; $W_{j,equip}$ is the total primary equipment power of the $j^{th}$ production process; $W_{j,fan}$ is the total fan power of the $j^{th}$ production process; $d_{fan}$ is the number of days of using fans in a whole year; $D_{annual}$ is the total number of workdays in a whole year; $W_{air}$ is the total air conditioner power; $t_{air}$ is the duration of using air conditioners in a whole year; and $Y_i$ is the annual output of the $i^{th}$ specification of the raw silk; and $E_{industry}$ is the actual annual total electricity consumption value. In the foregoing formula, apart from the value of $\eta$, other parameters may be obtained through investigation, allowing the equation to be solved for the running efficiency $\eta$ of the industrial equipment in the reference year.

Specifically, in Step S103, electricity consumption of various specifications of the raw silk are calculated as follows:

Once the operating efficiency is determined, it can be substituted back into Equation (15) to calculate the electricity consumption $E_i$ (i=1, 2, . . . , m) for each specification of raw silk. This can be expressed by the following formula:

$$E_i = \qquad (16)$$

$$\sum_{j=1}^{12}(t_{i,j}\,W_{j,light}) + \eta\sum_{j=1}^{12}(t_{i,j}W_{j,equip}) + \eta\sum_{j=1}^{12}\left(\frac{t_{i,j}d_{fan}W_{j,fan}}{D_{annual}}\right) + \eta\frac{Y_i t_{air} W_{air}}{\sum_{i=1}^{m} Y_i}$$

where, $t_{i,j}$ (i=1, 2, ..., m; j=1, 2, ..., 11) is the production duration of the $i^{th}$ specification of the raw silk in the $j^{th}$ production process thereof; $W_{j,light}$ is the total lighting power of the $j^{th}$ production process; $\eta$ is the running efficiency of the equipment; $W_{j,equip}$ is the total primary equipment power of the $j^{th}$ production process; $W_{j,fan}$ is the total fan power of the $j^{th}$ production process; $d_{fan}$ is the number of days of using fans in the whole year; $D_{annual}$ is the total number of workdays in the whole year; $W_{air}$ is the total air conditioner power; $t_{air}$ is the duration of using air conditioners in the whole year; and $Y_i$ is the annual output of the $i^{th}$ specification of the raw silk.

Specifically, in Step S104, byproduct carbon footprints are allocated as follows:

In the accounting of product carbon footprints, the allocation of byproducts plays a crucial role, and the utilization of byproducts can share a portion of the carbon emissions of the primary product. The allocation of byproducts in this invention is based on economic value, with the allocation endpoint being the node where the byproducts are generated. For example, since cocoon outer floss is generated in the cocoon stripping and sorting process, only carbon footprints from the first process to the cocoon stripping and sorting process in silk reeling production is allocated.

Let x be the output of raw silk, measured in kilograms (kg), and P be the market price of raw silk, measured in yuan. If there are n types of byproducts generated during the silk reeling process, with corresponding quantities $x_i$ (i=1, 2, ..., n), measured in kg, and the market price of each type of byproduct is $p_i$ (i=1.2 ... n) in yuan. When using stepwise allocation, that is, allocation is performed at each node where byproduct are generated, the proportion of the carbon footprint $d_i$ (i=1, 2, ..., n) borne by the raw silk product at the $i^{th}$ allocation is given by:

$$d_i = xp/(xp + x_i p_i) \qquad (17)$$

In this invention, the electricity consumption is first allocated stepwise among the 7 byproducts. After allocation, the total annual electricity consumption $E_i$ for each specification of raw silk during the silk reeling stage is given by:

$$\begin{cases} E'_i = \left(\left(\left(\sum_{j=1}^{3}E_{i,j}d_1 + E_{i,4}\right)d_2 + E_{i,4} + \sum_{j=5}^{7}E_{i,j}\right)d_{345} + \sum_{j=8}^{12}E_{i,j}\right)d_{67} \\ d_1 = \dfrac{\alpha p}{\alpha p + (1-\alpha)p_1} \\ d_2 = \dfrac{\beta p}{\beta p + (1-\beta)p_2} \\ d_{345} \dfrac{100p/\varepsilon}{100p/\varepsilon + \gamma p_3 + \delta p_4 + \xi p_5} \\ d_{67} = \dfrac{100p/\varepsilon}{100p/\varepsilon + \gamma p_3 + \delta p_4 + \xi p_5} \end{cases} \qquad (18)$$

where, $E_{i,j}$ (i=1, 2, ..., m; j=1, 2, ..., 10) is an electricity consumption of an $i^{th}$ specification of raw silk in a $j^{th}$ production process thereof, and $M_{silk,i}$ (i=1.2 ... m) is an total annual production output of the $i^{th}$ specification of raw silk; $\alpha$ is a mass loss fraction in cocoon peeling, a percentage of a weight of the peeled dried cocoons after cocoon peeling in a weight of raw dried cocoons; $\beta$ is mass loss fraction in cocoon sorting, a percentage of a weight of the reelable cocoons after cocoon sorting in a weight of the peeled dried cocoons before cocoon sorting; $\varepsilon$ is a reeling loss; $\gamma$ is a frison fraction; $\delta$ is a pupa shell fraction; $\xi$ is a pupa fraction; and p is a selling price of the primary product, $p_i$ (i=1, 2, ..., n) is a market price of an $i^{th}$ type of byproduct in a referenced year; $d_i$ (i=1, 2, ..., n) is an allocation ratio of the $i^{th}$ byproduct during carbon footprint allocation, therefore $d_1$ denotes an allocation ratio of a byproduct 1 participating in allocation, $d_2$ denotes an allocation ratio of a byproduct 2 participating in allocation, and so on; $d_{345}$ denotes an allocation ratio of byproducts 3, 4, and 5 participating in allocation simultaneously; and $d_{67}$ denotes a allocation ratio of byproducts 6 and 7 participating in distribution simultaneously.

Specifically, in Step S105, the allocation of the carbon footprint for other energy and material inputs is as follows:

For other energy and material inputs, unlike electricity, which spans the entire process, the allocation is only made where there is shared usage. If there is no shared usage, no allocation is made. For inputs that are shared, and particularly those that are utilized in a single process step, a one-time allocation method is used at the end rather than a stepwise allocation method. The allocation ratio d is defined as:

$$d = xp \bigg/ \left(xp + \sum_{i=1}^{n_e} x_i p_i\right) \qquad (19)$$

In the formula, $n_e$ ($n_e \leq n$) is the number of types of byproducts with shared inputs.

According to the mass evolution relationship shown in FIG. 2, the specific allocation ratio for each type of input will vary. Discussions are provided below.

(1) For the electricity consumption involved in water taking, waste water treatment, reused water treatment, and the like, byproducts 3, 4, 5, 6, and 7 participate in the allocation, and in this case the allocation ratio may be written as:

$$d_{3-7} = \frac{100(1-\lambda)p}{\varepsilon} \bigg/ \qquad (20)$$

$$\left(\frac{100(1-\lambda)p}{\varepsilon} + \gamma p_3 + \delta p_4 + \xi p_5 + \frac{100\lambda p_6}{\varepsilon} + \left(\frac{M_{bypro7}Y_i}{M_s \sum_{i=1}^{m} Y_i}\right)\frac{100(1-\lambda)p}{\varepsilon}\right)$$

(2) For steam used in the cocoon cooking stage, some enterprises use natural gas, and some use a biomass fuel. In this part of inputs, the byproducts 3 to 7 participate in allocation. In this case, Formula (20) is used for the allocation ratio.

(3) For material inputs for waste water treatment, byproducts 3 to 7 also participate in allocation, and Formula (20) is used for the allocation ratio.

(4) For the input and use of water resources, byproducts 3 to 7 also participate in allocation, and Formula (20) is used for the allocation ratio.

(5) Coal is generally used in a cocoon drying stage, and all byproducts participate in allocation. The following formula is used for the allocation ratio.

$$d_{all} = \frac{100\alpha\beta(1-\lambda)p}{\varepsilon} \Bigg/ \left( \begin{array}{l} 100\alpha\beta(1-\lambda)p/\varepsilon + (1-\alpha)p_1 + \alpha(1-\beta)p_2 + \alpha\beta\gamma p_3 + \alpha\beta\delta p_4 + \\ \alpha\beta\xi p_5 + 100\alpha\beta\lambda p_6/\varepsilon + \left(\dfrac{M_{bypro7}Y_i}{M_s \sum\limits_{i=1}^{m} Y_i}\right)100\alpha\beta(1-\lambda)p/\varepsilon \end{array} \right) \quad (21)$$

(6) The carbon emissions from transportation are complex, because they involve the transportation of fresh cocoon raw materials, waste water treatment materials, solid waste, etc. Here, the distribution ratio according to Formula (21) is uniformly used.

Specifically, in Step S105, carbon footprint accounting for each specification of raw silk is as follows:

The carbon footprint accounting formula for each specification of raw silk is as follows:

$$CFP_i = \left( (E'_i + d_{3-7} \times E_{water}) f_{electricity} + \sum_{k=1}^{n_m} d_x MT_{i,k} f_{MT_k} \right) \Bigg/ \sum_{i=1}^{m} Y_i \quad (22)$$

where, $CFP_i$ (i=1, ..., m) is the carbon footprint of the $i^{th}$ specification of raw silk; $E_{waste}$ is the electricity consumption of water taking, waste water treatment, and reused water treatment; $f_{electricity}$ is the carbon emission factor of electricity power, which varies depending on the production place; $MT_{i,k}$ (i=1, 2, ..., m; k=1, 2,$n_m$) is a consumption of a $k^{th}$ input of material and energy for the $i^{th}$ specification of the raw silk. The energy sources include water, natural gas, coal, biomass fuel, and the like; and $f_{MT_k}$ is a greenhouse gas emission factor of the $k^{th}$ input of material, energy, and the like, $d_x$ is a carbon footprint allocation ratio, which an be $d_{456}$ or $d_{123456}$, depending on the specific input.

In the present invention, a mass evolution relationship between a primary product and various co-products throughout the entire production process is established based on the principle of mass conservation, and a system and method for electricity consumption allocation and carbon footprint accounting during the silk reeling stage is constructed based on the categories and mass evolution of the primary product. This changes the conventional practice of simply allocating the carbon footprint of the final product based on economic value, achieving precise accounting and allocation of the carbon footprint during the silk reeling stage of raw silk.

Embodiment 2

In this embodiment, a carbon footprint accounting method for a silk reeling stage of raw silk provided in this invention is further described.

A study was conducted on a silk reeling enterprise in a province to analyze the carbon footprint distribution of their 27/29D specification of raw silk. The enterprise generally produces two specifications of raw silk: 27/29D specification and 20/22D specification. In 2020, the total production of 27/29D specification of raw silk was 34.1 tons, while the production of 20/22D specification is 19.93 tons.

Basic production process parameters for 27/29D specification of raw silk under study are shown in Table 1.

TABLE 1

| Basic production process parameters for 27/29D specification of raw silk | |
|---|---|
| Average drying ratio | 2.74 |
| Average cocoon stripping percentage/% | 2 |
| Average cocoon sorting percentage/% | 20 |
| Average reeling discount | 274 |
| Average frison percentage/% | 0.0406 |
| Average pupa shell percentage/% | 0.0309 |
| Average pupa percentage/% | 55.3 |
| Average inspection silk percentage/% | 0.145 |
| Average percentage of raw silk from trial reeling/% | 0.00925 |
| Average hourly output of one unit of reeling machine/(g/h) | 388 |
| Average silk reeling speed/(r/min) | 165 |

1. Calculation of Processing Duration (1) Cocoon Drying Process

The raw material cocoons are generally fresh cocoons, and the cocoon drying machine is an equipment that operates 24 hours a day, supplying 10 tons of cocoons per day. However, the cocoon drying area in the investigated factory has a separate electricity meter, and therefore the duration of this process does not need to be calculated.

(2) Cocoon Mixing Process

This process is manual cocoon mixing, and therefore the duration of this process does not need to be calculated.

(3) Cocoon Tripping and Sorting Process

This process uses a cocoon stripping and sorting joint machine, with one cocoon stripping machine paired with one cocoon sorting belt. The cocoon stripping efficiency is 100 kg/h, and the cocoon sorting efficiency is 45 kg/h. Using Formulas (6) and (7), the calculated durations for stripping and sorting are 1193 h and 2650 h, respectively.

(4) Trial Reeling

For this process, a trial reeling involves 200 cocoons per trial reeling machine with 10 ends. It can be estimated according to Formula (8) that a total duration of trial reeling is 14.79 h.

(5) Cocoon Cooking Process

The cocoon cooking efficiency is 80 kg/h, and a processing duration $t_6$ of the process obtained according to Formula (9) is 1,168.78 h.

(6) Silk Reeling Process

A size-fixed silk reeling machine is used in the silk reeling process, and each group of reeling machine consists of 20 units, with each unit having 20 ends. A processing duration $t_7$ of the process calculated according to the parameters in Table 1 and Formula (10) is 4,393.99 h.

(7) Vacuum Infiltration Process

In the vacuum infiltration, an actual running time (including the start and end of vacuuming) of the moistening machine is 7.2 min. In vacuum moistening once, "vacuuming-normal pressure" is repeated 12 times, and the amount of raw silk on each small silk reel is approximately 180 g. It can be calculated according to Formula (11) that the processing duration $t_8$ of the process is 2732.1 h.

(8) Re-Reeling Stage

During re-reeling, each machine has a total of 100 large reels. Each large reel has a circumference of 1.5 meters. The hourly output of re-reeling can be calculated according to the re-reeling speed 220 r/min and a nominal fineness of raw silk being 28 denier according to Formula (12), to obtain that the processing duration of the process is 5,544.03 h.

(9) Packing Process

After the re-reeling process, silk end tying and skein lacing will be conducted. This process is completed manually with only lighting and electricity fans being used. Subsequently, booking and packing is conducted using a skein booking and packing machine. Every 28 silk skeins are bundled into a book, and the booking process takes 1 minute per book. Therefore, the processing time for the packaging process, used to calculate the main equipment's electricity consumption, is determined to be 112.93 h according to Formula (13).

(10) Raw Silk Inspection

The raw silk inspection includes two types of tests: silk size inspection (including moisture regain measurement) and Seriplane inspection. It is calculated, according to Formula (14), that respective working durations of the two tests are 99.46 h and 29.84 h.

Figure 3:
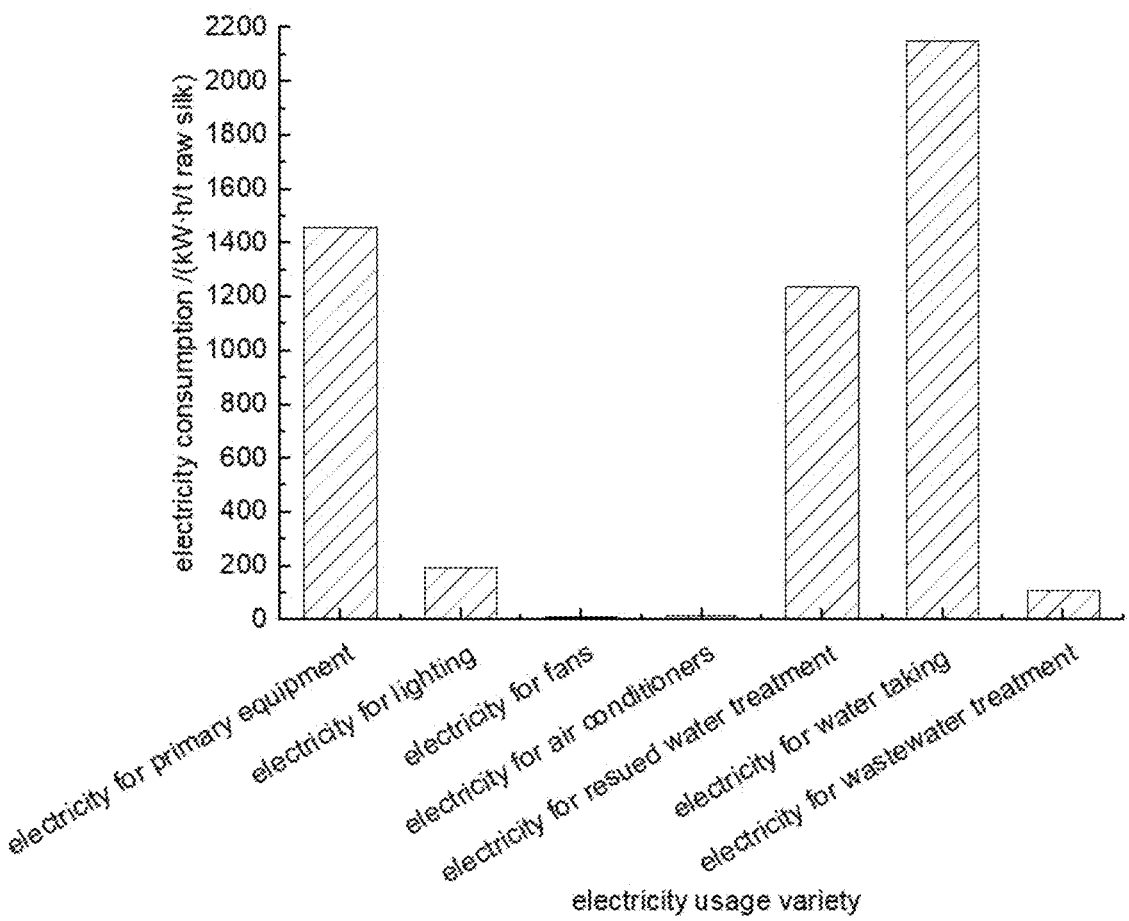
FIG. 3 is a diagram of electricity consumption distribution of lighting, fans, air conditioners, primary equipment, and the like in processes according to an embodiment of the present invention.
Figure 4:
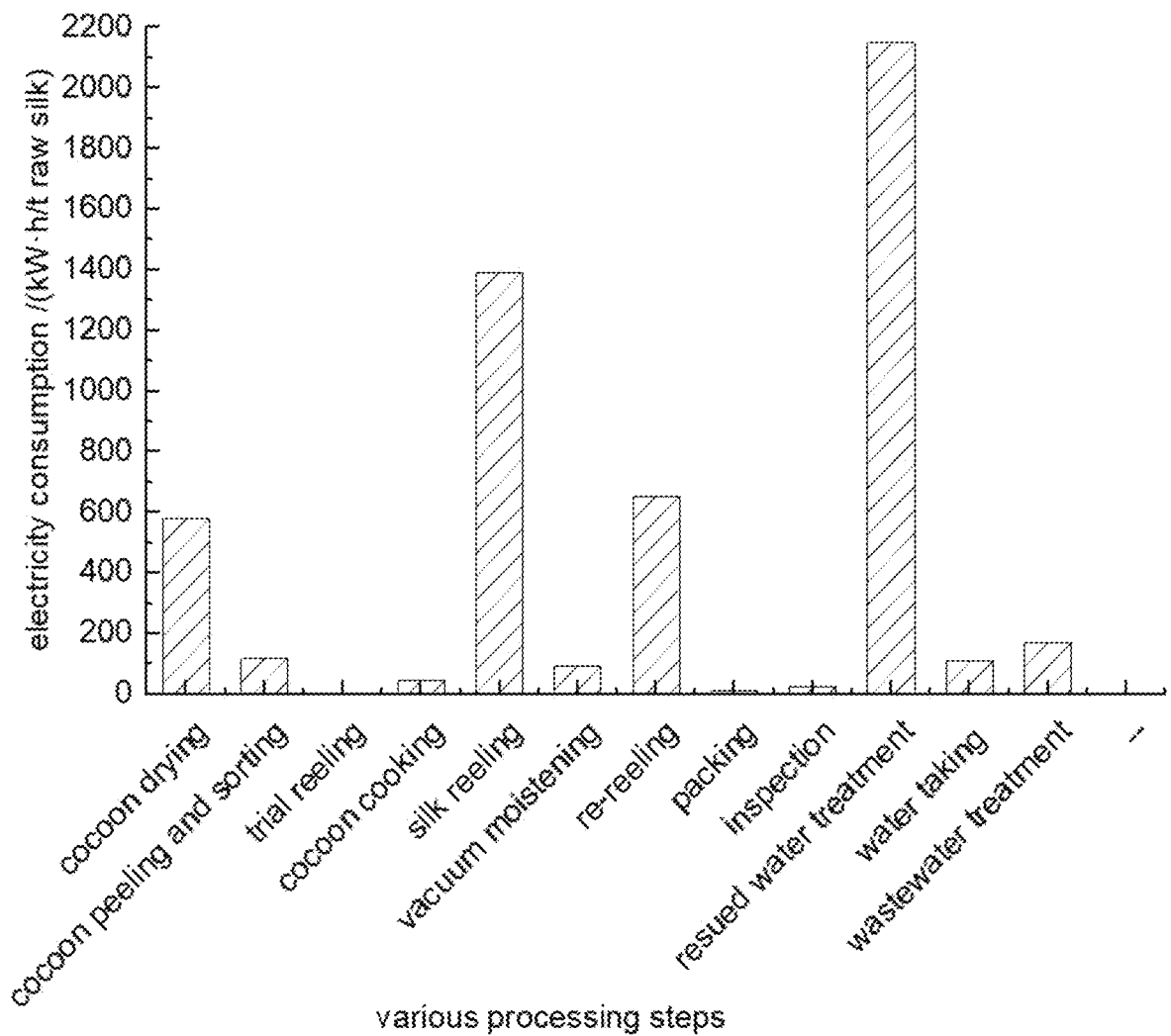
FIG. 4 is a diagram of electricity consumption distribution of processes according to an embodiment of the present invention.

2. Calculation of the Electricity Consumption of the 27/29D Specification of Raw Silk According to Formula (15), the running efficiency of the equipments in the silk reeling mill in 2020 is 0.58. Based on Equation (16), the distribution of electricity consumption for each process, including the distribution of lighting, fans, air conditioners, and primary production equipment in each process can be calculated. This is shown in FIG. 3 and FIG. 4.

3. Byproduct Allocation

The price for 27/29D specification of raw silk in the factory in 2020 was 380 RMB/kg. The price of the byproduct 2, that is, defective cocoons, is 80 RMB/kg. The byproduct 1, that is, cocoon outer floss, and the byproduct 4, that is, pupa shell, are both processed into silk floss sold at 280 RMB/kg. The byproduct 3, that is, frison, is 85.6 RMB/kg. The price of silkworm pupa is 2.2 RMB/kg. In the end of silk reeling, remnants of pupa lining unable to be separated completely from the pupa, priced at 1 RMB/kg. A mass ratio of silkworm pupa to pupa lining residue is 2:1. Therefore, the average price of the byproduct 5 is 1.8 RMB/kg. Byproduct 6, waste silk from silk inspection, is priced at 230 RMB/kg, while raw silk from trial reeling is priced at 220 yuan/kg.

According to the foregoing prices and Formulas (20) and (21), the allocation ratios shown in the following Table 2 can be calculated:

TABLE 2

Byproduct allocation ratios for 27/29D specification of raw silk

| $d_1$/% | $d_2$/% | $d_{345}$/% | $d_{67}$/% | $d_{3-7}$/% | $d_{all}$/% |
|---|---|---|---|---|---|
| 98.52 | 95 | 91.35 | 99.89 | 91.13 | 79.7 |

Figure 5:
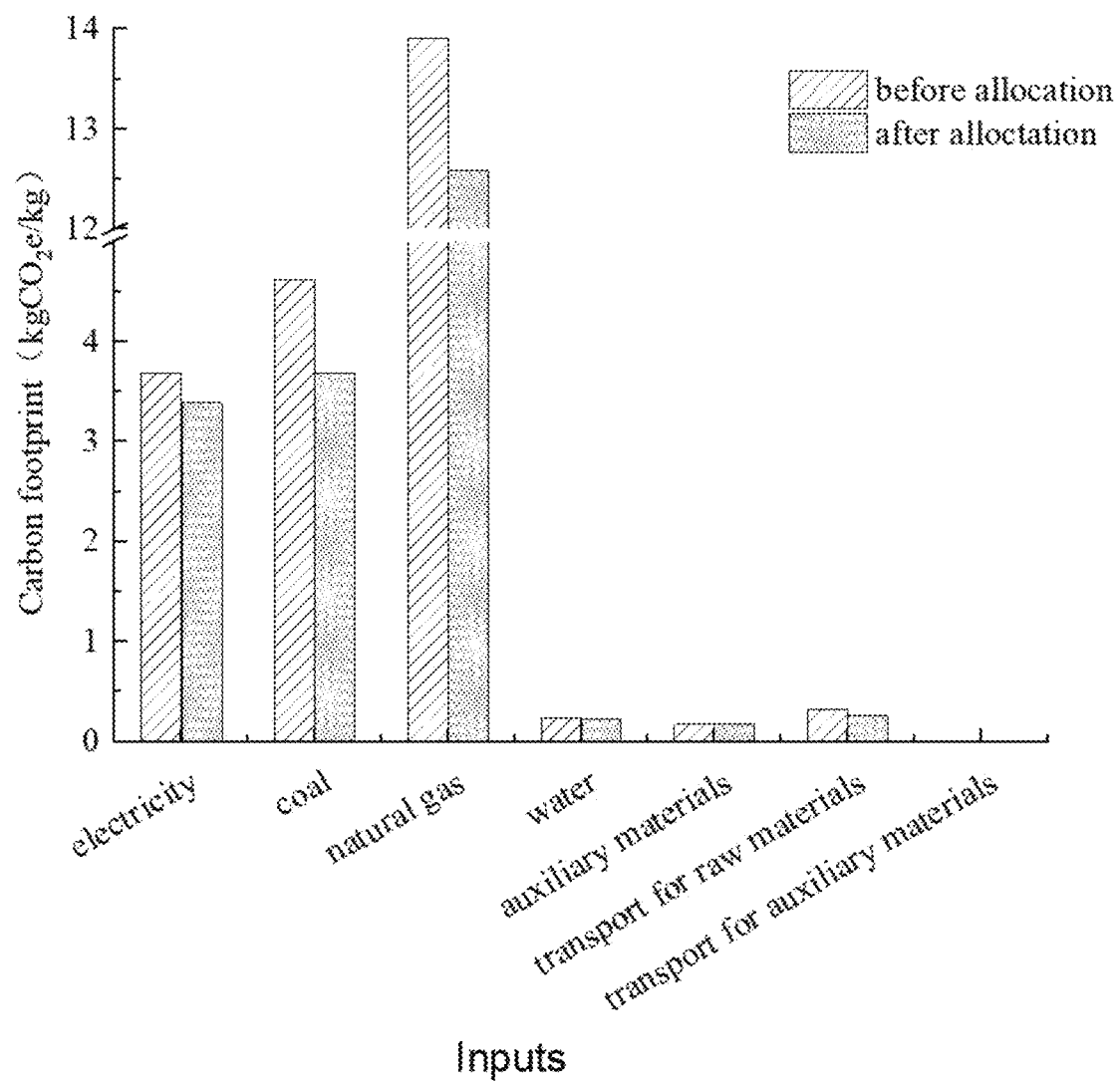
FIG. 5 is a diagram of carbon footprint distribution in a silk reeling stage of raw silk before and after byproduct allocation according to an embodiment of the present invention.

4. Calculation of Carbon Footprint Distribution in a Silk Reeling Stage of Raw Silk According to Formula (22) and the allocation rule for each type of input, carbon footprint distribution of the silk reeling stage of raw silk before and after byproduct allocation shown in FIG. 5 can be calculated. Before allocating the carbon footprint of by-products, the carbon footprint of the silk reeling stage of the 27/29D specification is 22.95 tCO2e/kg raw silk, which decreased to 20.3 tCO2e/kg raw silk after byproduct allocation.

Corresponding to the foregoing method embodiments, the embodiments of the present invention further provide a computer device, including:

a memory, configured to store a computer program; and a processor, configured to implement, when executing the computer program, the steps of the foregoing carbon footprint accounting method for a silk reeling stage of raw silk.

In the embodiments of the present invention, the processor may be a central processing unit (CPU), an application specific integrated circuit, a digital signal processor, a field programmable gate array, another programmable logic device or the like.

The processor may invoke a program stored in the memory. Specifically, the processor may perform the processes in the embodiments of the carbon footprint accounting method for a silk reeling stage of raw silk.

The memory is configured to store one or more programs. The program may include program code. The program code includes computer process instructions.

Moreover, the memory may include a high-speed random access memory (RAM), and may further include a non-volatile memory, for example, at least one magnetic disk storage device, or other volatile solid state storage device.

Corresponding to the foregoing method embodiments, the embodiments of the present invention further provide a computer-readable storage medium. The computer-readable storage medium stores a computer program. The computer program implements, when being executed by the processor, the steps in the foregoing carbon footprint accounting method for a silk reeling stage of raw silk.

Persons skilled in the art should understand that the embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product implemented on one or more computer-usable storage media (including, but not limited to, a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes instructions apparatus. The instruction apparatus implements a specific function in one or more processes in the flowcharts and/or in one or more blocks in the block diagrams.

The computer program instructions may alternatively be loaded onto a computer or another programmable data processing device, so that a series of processes and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

Obviously, the foregoing embodiments are merely examples for clear description, rather than a limitation to implementations. For a person of ordinary skill in the art, other changes or variations in different forms may also be made based on the foregoing description. All implementations cannot and do not need to be exhaustively listed herein. Obvious changes or variations that are derived there from still fall within the protection scope of the invention of the present invention.

What is claimed is:

1. A method for accounting a carbon footprint of a silk reeling stage of raw silk, comprising:
   establishing a mass conservation-based mass evolution relationship between a primary product and byproducts in the silk reeling stage of the raw silk, the mass conservation-based mass evolution relationship comprising a cocoon drying process from fresh cocoons to dried cocoons, a cocoon peeling process from the dried cocoons to peeled dried cocoons, a cocoon sorting process from the peeled dried cocoons to reelable cocoons, and a silk reeling process from the reelable cocoons to the raw silk;
   calculating durations according to masses of the primary product, and calculating a theoretical annual total electricity consumption in the silk reeling stage of the raw silk in combination with power of equipment;
   establishing an equation to equate the theoretical annual total electricity consumption with an actual annual total electricity consumption to solve a running efficiency of the equipment, and calculating a total electricity consumption for each specification of the raw silk based on the running efficiency;
   allocating the total electricity consumption for each specification of the raw silk to the byproducts step by step at each byproduct generation point, to obtain annual electricity consumption for each specification of the raw silk during the silk reeling stage after allocation; establishing a byproduct allocation rule for other inputs including energy and material, and building an allocation ratio calculation model of various inputs in the silk reeling process of the raw silk;
   performing carbon footprint accounting of various specifications of the raw silk according to the annual electricity consumption and the byproduct allocation rule and allocation ratios of the other inputs of energy and material to obtain the carbon footprint of the silk reeling stage of raw silk; and
   utilizing the carbon footprint of the silk reeling stage of raw silk to implement energy-saving and emission-reduction control by adjusting operational parameters of equipment in each production process, including operating speed, processing capacity, and running efficiency of each machine, to optimize energy efficiency and reduce carbon emissions, and by adjusting production process parameters including mass loss fraction in each cocoon processing process, frison fraction, pupa shell fraction, and pupa fraction to alter byproduct carbon footprint allocation ratios, thereby achieving low-carbon production control and process optimization in the cocoon drying process, the cocoon peeling process, the cocoon sorting process, and the silk reeling process.

2. The method according to claim 1, wherein calculating durations according to masses of the primary product comprises:
   performing calculation according to total amounts of the primary product during the processes and production capacities of the processes, or performing calculation directly according to a total number of workdays based on output proportions of different specifications.

3. The method according to claim 1, wherein a calculation formula for solving the running efficiency of the equipment is as follows:

$$\sum_{i=1}^{m}\left(\sum_{j=1}^{12}(t_{i,j}W_{j,light}) + \eta\sum_{j=1}^{12}(t_{i,j}W_{j,equip}) + \sum_{j=1}^{12}\left(\frac{t_{i,j}d_{fan}W_{j,fan}}{D_{annual}}\right) + \eta\frac{Y_i t_{air}W_{air}}{\sum_{i=1}^{m}Y_i}\right) = E_{industry}$$

wherein in the formula, $t_{i,j}$ (i=1, 2, ..., m; j=1, 2, ..., 11) is a production duration of an $i^{th}$ specification of the raw silk in a $j^{th}$ production process thereof; $W_{j,light}$ is a total lighting power of the $j^{th}$ production process; $\eta$ is the running efficiency of the equipment; $W_{j,equip}$ is a total primary equipment power of the $j^{th}$ production process; $W_{j,fan}$ is a total fan power of the $j^{th}$ production process; $d_{fan}$ is a number of days of using fans in a whole year; $D_{annual}$ is a total number of workdays in a whole year; $W_{air}$ is a total air conditioner power; $t_{air}$ is a duration of using air conditioners in a whole year; and $Y_i$ is an annual output of the $i^{th}$ specification of the raw silk, and $E_{industry}$ is an actual annual total electricity consumption value.

4. The method according to claim 1, wherein a formula for calculating the total electricity consumption of various specifications of the raw silk is as follows:

$$E_i = \sum_{j=1}^{12}(t_{i,j}W_{j,light}) + \eta\sum_{j=1}^{12}(t_{i,j}W_{j,equip}) + \eta\sum_{j=1}^{12}\left(\frac{t_{i,j}d_{fan}W_{j,fan}}{D_{annual}}\right) + \eta\frac{Y_i t_{air}W_{air}}{\sum_{i=1}^{m}Y_i}$$

wherein $t_{i,j}$ (i=1, 2, ..., m; j=1, 2, ..., 11) is a production duration of an $i^{th}$ specification of the raw silk in a $j^{th}$ production process thereof; $W_{j,light}$ is a total lighting power of the $j^{th}$ production process; $\eta$ is the running efficiency of the equipment; $W_{j,equip}$ is a total primary equipment power of the $j^{th}$ production process; $W_{j,fan}$ is a total fan power of the $j^{th}$ production process; $d_{fan}$ is a number of days of using fans in a whole year; $D_{annual}$ is a total number of workdays in a whole year; $W_{air}$ is a total air conditioner power; $t_{air}$ is a duration of using air conditioners in a whole year; and $Y_i$ is an annual output of the $i^{th}$ specification of the raw silk.

5. The method according to claim 1, wherein when allocating the total electricity consumption for each specification of the raw silk to the byproducts step by step at each byproduct generation point, the allocation is performed at each process node where the byproducts are generated, and the electricity consumption for allocation is cut off at the node where the byproduct is generated.

6. The method according to claim 1, wherein seven byproducts generated in a silk reeling production process of the raw silk comprises: cocoon outer floss, defective cocoons, frison, pupa shell, pupa, waste silk from inspection, and trial reeling raw silk.

7. The method according to claim 1, wherein after allocating the total electricity consumption for each specification of the raw silk to the byproducts step by step at each byproduct generation point, the obtained annual electricity consumption for different specifications of the raw silk in the silk reeling stage of the raw silk are as follows:

$$\begin{cases} E'_i = \left(\left(\left(\sum_{j=1}^{3} E_{i,j} d_1 + E_{i,4}\right) d_2 + E_{i,4} + \sum_{j=5}^{7} E_{i,j}\right) d_{345} + \sum_{j=8}^{12} E_{i,j}\right) d_{67} \\ d_1 = \dfrac{\alpha p}{\alpha p + (1-\alpha)p_1} \\ d_2 = \dfrac{\beta p}{\beta p + (1-\beta)p_2} \\ d_{345} = \dfrac{100 p/\varepsilon}{100 p/\varepsilon + \gamma p_3 + \delta p_4 + \xi p_5} \\ d_{67} = \dfrac{100 p/\varepsilon}{100 p/\varepsilon + \gamma p_3 + \delta p_4 + \xi p_5} \end{cases}$$

wherein $E_{i,j}$ (i=1, 2, ..., m; j=1, 2, ..., 10) is an electricity consumption of an $i^{th}$ specification of the raw silk in a $j^{th}$ production process thereof; $\alpha$ is a mass loss fraction in cocoon peeling, a percentage of a weight of the peeled dried cocoons after cocoon peeling in a weight of raw dried cocoons; $\beta$ is mass loss fraction in cocoon sorting, a percentage of a weight of the reelable cocoons after cocoon sorting in a weight of the peeled dried cocoons before cocoon sorting; $\varepsilon$ is a reeling loss; $\gamma$ is a frison fraction; $\delta$ is a pupa shell fraction; $\xi$ is a pupa fraction; and p is a selling price of the primary product, $p_i$ (i=1, 2, ..., n) is a market price of an $i^{th}$ type of byproduct in a referenced year; $d_i$ (i=1, 2, ..., n) is an allocation ratio of the $i^{th}$ byproduct during carbon footprint allocation, therefore $d_1$ denotes an allocation ratio of a byproduct 1 participating in allocation, $d_2$ denotes an allocation ratio of a byproduct 2 participating in allocation, and so on; $d_{345}$ denotes an allocation ratio of byproducts 3, 4, and 5 participating in allocation simultaneously; and $d_{67}$ denotes an allocation ratio of byproducts 6 and 7 participating in allocation simultaneously.

8. The method according to claim 1, wherein when allocating other inputs of energy and material, examining each type of input individually, performing allocation for shared input, and no allocation for input without sharing; for the shared allocation, energy or material that are input once in a certain process are allocated only once at the end, and the allocation ratio dis calculated as follows:

$$d = xp \bigg/ \left( xp + \sum_{i=1}^{n_e} x_i p_i \right)$$

wherein $n_e$ ($n_e \leq n$) is the number of types of byproducts with shared inputs, $x_i$ (i=1, 2, ..., n) denotes an output of an $i^{th}$ byproduct in silk reeling production, x is an output of the primary product, and p is a selling price of the primary product, $p_i$ (i=1, 2, ..., n) is a market price of an $i^{th}$ type of byproduct in a referenced year.

9. The method according to claim 8, wherein water taking, waste water treatment, reused water treatment, and steam are inputs in a cocoon cooking process and the silk reeling process, mainly byproducts 3, 4, 5, 6, and 7 participate in allocation, and a distribution ratio is calculated as follows:

$$d_{3-7} = \dfrac{100(1-\lambda)p}{\varepsilon} \bigg/ \left( \dfrac{100(1-\lambda)p}{\varepsilon} + \gamma p_3 + \delta p_4 + \xi p_5 + \dfrac{100\lambda p_6}{\varepsilon} + \left(\dfrac{M_{bypro7}}{\sum_{i=1}^{m} Y_i}\right)\dfrac{100(1-\lambda)p}{\varepsilon} \right)$$

wherein $d_{3-7}$ is the distribution ration; $Y_i$ (i=1, 2, ..., m) is an annual total production output of an $i^{th}$ specification of the raw silk; $M_{bypro7}$ is a total annual amount of the raw silk from trial reeling; $\varepsilon$ is a reeling loss; $\gamma$ is a frison fraction; $\delta$ is a pupa shell fraction; $\xi$ is a pupa fraction; $p_i$ (i=1, 2, ..., n) is a market price of an $i^{th}$ type of byproduct in a referenced year; $\lambda$ is a percentage of waste silk from inspection.

10. The method according to claim 7, wherein a formula of the carbon footprint accounting of the specifications of the raw silk is as follows:

$$CFP_i = \left( (E'_i + d_{3-7} \times E_{water}) f_{electricity} + \sum_{k=1}^{n_m} d_x MT_{i,k} f_{MT_k} \right) \bigg/ \sum_{i=1}^{m} Y_i$$

wherein $CFP_i$ (i=1, ..., m) is a carbon footprint of the $i^{th}$ specification of the raw silk; $E_{waste}$ is an electricity consumption of water taking, waste water treatment, and reused water treatment; $f_{electricity}$ is a carbon emission factor of electricity power; $MT_{i,k}$ (i=1, 2, ..., m; k=1,2, nm) is a consumption of a $k^{th}$ input of material and energy for the $i^{th}$ specification of the raw silk; and $f_{MT_k}$ is a greenhouse gas emission factor of the $k^{th}$ input of material and energy, $d_x$ is a carbon footprint allocation ratio for different inputs of material and energy, with subscript x indicating different values for various inputs, and $d_{3-7}$ is the allocation ratio of the byproducts 3, 4, 5, 6, and 7 participating in allocation, and $Y_i$ (i=1, 2, ..., m) is an annual total production output of the $i^{th}$ specification of the raw silk.

* * * * *